United States Patent
Cho et al.

(10) Patent No.: US 7,215,882 B2
(45) Date of Patent: *May 8, 2007

(54) HIGH-SPEED AUTOMATIC FOCUSING SYSTEM

(75) Inventors: Gyoung Il Cho, Seoul (KR); Tae Hyeon Kim, Taejeon (KR); Dong Woo Gim, Gyoungnam (KR); Cheong Soo Seo, Seoul (KR)

(73) Assignees: Angatrom, Inc., Suwon (KR); Stereo Display, Inc., Anaheim, CA (US)

( * ) Notice: Subject to any disclaimer, the term of this patent is extended or adjusted under 35 U.S.C. 154(b) by 131 days.

This patent is subject to a terminal disclaimer.

(21) Appl. No.: 10/896,146

(22) Filed: Jul. 21, 2004

(65) Prior Publication Data
US 2006/0018651 A1    Jan. 26, 2006

(51) Int. Cl.
*G03B 13/36* (2006.01)
*G02B 5/08* (2006.01)
(52) U.S. Cl. .......................... 396/89; 359/851
(58) Field of Classification Search ................ 396/89, 396/111, 72; 359/291, 295; 348/345, 357
See application file for complete search history.

(56) References Cited

U.S. PATENT DOCUMENTS

| | | |
|---|---|---|
| 4,132,468 A | 1/1979 | Lo et al. |
| 4,214,257 A | 7/1980 | Yamauchi |
| 4,717,949 A | 1/1988 | Eichenlaub |
| 4,945,407 A | 7/1990 | Winnek |
| 5,264,964 A | 11/1993 | Faris |
| 6,046,849 A | 4/2000 | Moseley et al. |
| 6,055,013 A | 4/2000 | Woodgate et al. |
| 6,658,208 B2 * | 12/2003 | Watanabe et al. ............. 396/89 |
| 6,906,848 B2 * | 6/2005 | Aubuchon ................... 359/291 |
| 6,934,072 B1 * | 8/2005 | Kim et al. ................... 359/291 |
| 7,031,046 B2 * | 4/2006 | Kim et al. ................... 359/291 |
| 2006/0012852 A1 * | 1/2006 | Cho et al. .................... 359/291 |

OTHER PUBLICATIONS

James G. Boyd IV and Gyoungil Cho, "Fast-response Variable Focusing Micromirror Array Lens," Proc. SPIE, vol. 5055, pp. 278-286 (2003).
Mukul V. Shirvaikar, "An Optimal Measure for Camera Focus and Exposure," Proc. IEEE SSST 2004 (2004).

* cited by examiner

*Primary Examiner*—W. B. Perkey (57) ABSTRACT

An automatic focusing system comprises at least one micromirror array lens, an image sensor, and a signal processor. The micromirror array lens images an object and focuses the image on the image sensor. The image sensor receives the light and converts the photo energy of the light to electrical energy in the form of an electrical signal. The image sensor sends the electrical signal, which carries image data concerning the object, to the signal processor. The signal processor receives the electrical signal, compares the image quality of the image data to its focus criteria, and generates a control signal, which it sends to the micromirror array lens to adjust the focal length of the micromirror array lens. This iterative process is continued until the quality of the image data meets the focus criteria, and the process is completed within the afterimage speed of the human eye.

28 Claims, 5 Drawing Sheets

HIGH-SPEED AUTOMATIC FOCUSING SYSTEM

FIELD OF THE INVENTION

The present invention relates generally to an automatic focusing system and, more specifically, to a high-speed automatic focusing system comprising at least one micromirror array lens.

BACKGROUND

Many conventional imaging devices such as cameras, camcorders, and other alternatives, use automatic focusing systems to capture sharper images easily. Conventional automatic focusing lens systems comprise a series of lenses, lens moving mechanisms, image sensors and signal processors. When the imaging device and/or the imaged object is moved abruptly, the imaging device loses focus of an image because conventional automatic focusing systems have low focusing speeds. Therefore, the imaging device obtains a blurred image.

Most conventional automatic focusing imaging devices use an electromagnetically driven motor and/or piezo-electrically actuated apparatus to move one or more lenses for focusing. But the response speed of conventional automatic focusing systems is too slow because the conventional refracting lenses and conventional lens-moving mechanisms incorporated in the imaging device have considerable inertia. For the electromagnetic motor, the response speed is limited by the magnetic inductance. Imaging devices with fast automatic focusing have not appeared yet.

Thus there is a practical need for an improved automatic focusing system that enables clear images to be captured within an instance of time. Such system must be easy to manufacture and adapted for use with existing imaging devices.

SUMMARY OF THE INVENTION

The present invention is directed to a high-speed auto focusing lens system capable of capturing clear images of fast moving objects and/or capturing clear images while an imaging device is moving and/or vibrating. Auto focusing systems of the present invention comprise at least one micromirror array lens, an image sensor, and a signal processor. The micromirror array lens comprises a plurality of micromirrors that are controlled by actuating components. The actuating components retract and/or elevate the micromirrors to length or shorten the optical path of the light scattered from the object to remove phase aberrations from the image.

In accordance with the invention, the micromirror array lens images an object by reflecting the light scattered from the object to the image sensor. The image sensor receives the light and converts the photo energy of the light to electrical energy in the form of an electrical signal. The image sensor sends the electrical signal, which carries image data concerning the object, to the signal processor. The signal processor receives the electrical signal, compares the image quality of the image data to its focus criteria, and generates a control signal, which it sends to the actuating components of the micromirror array lens to adjust the focal length of the micromirror array lens. This iterative process is continued until the quality of the image data meets the focus criteria, and the entire iterative process is completed within the afterimage speed of the human eye.

An active automatic focusing system of the present invention may comprise a distance measuring device. The distance measuring device projects beams of energy out to an object and detects the energy reflected from the object to determine the correct focusing distance. Once the focusing distance is determined, the signal processor applies the Lens Formula to calculate the effective focal length of the system. The signal processor then generates a control signal and sends it to the micromirror array lens to adjust its focal length, accordingly.

Automatic focusing systems of the present invention may also include a micromirror array lens in combination with or without conventional lenses, when used in imaging systems and zooming systems of imaging devices.

Automatic focusing systems of the present invention provide real-time automatic focusing because the speed of the focal length change of the micromirror array lens is approximately 10 kHz. Automatic focusing systems of the present invention may comprise a micromirror array lens in combination with one or more conventional refractive lenses when used in imaging systems and/or zooming systems of imaging devices.

Automatic focusing systems of the present invention eliminate the need for lens moving mechanisms of conventional automatic focusing systems by applying the micromirror array lens to a focusing element. Since the present invention has a smaller number of parts, and no macroscopic moving parts, the invention can reduce physical dimensions, weight, and production cost of the automatic focusing system. The present invention also can improve the ruggedness and service life of automatic focusing systems.

In conclusion, the advantages provided by the present invention over auto focusing systems of the prior art, are as follows:

(1) Clear images are captured in real-time;
(2) Such systems are cost effective and easy to fabricate;
(3) There is no macroscopic lens movement, thus increasing the reliability of the whole system; and
(4) By adding one or more micromirror array lenses, one can easily construct a fast variable zooming system without using macroscopic moving elements.

BRIEF DESCRIPTION OF THE DRAWINGS

These and other features, aspects and advantages of the present invention will be better understood by reference to the following detailed description when considered in conjunction with the accompanying drawings, wherein.

Figure 9:
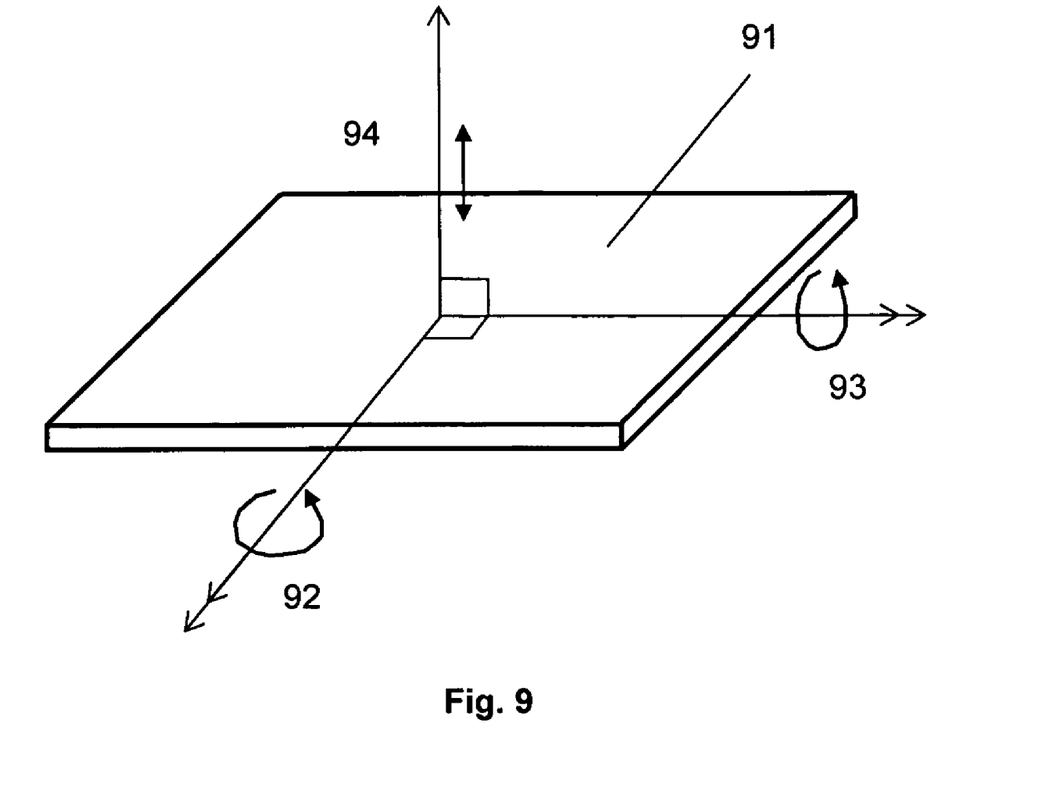

FIG. 9 shows two degree of freedom rotations and one degree of freedom translation of the micromirror 91. The array comprising micromirrors 91 with two degree of freedom rotations 92, 93 and one degree of freedom translation 94, which are controlled independently can make a lens with arbitrary shape and/or size lens. To do this, it is required that incident lights are deflected to an arbitrary direction by controls of two degree of freedom rotations 92, 93. Independent translation 94 of each micromirror is also required to satisfy the phase condition.

DETAILED DESCRIPTION

In a particularly preferred embodiment of the invention there is provided an auto focusing system for existing digital and/or analog imaging devices. The auto focusing system comprises at least one micromirror array lens, in combination with an image sensor and a signal processor. The auto focusing system provides high-speed auto focusing to compensate for the defocusing caused by sudden movement of the target object and/or the imaging device.

Figure 1:
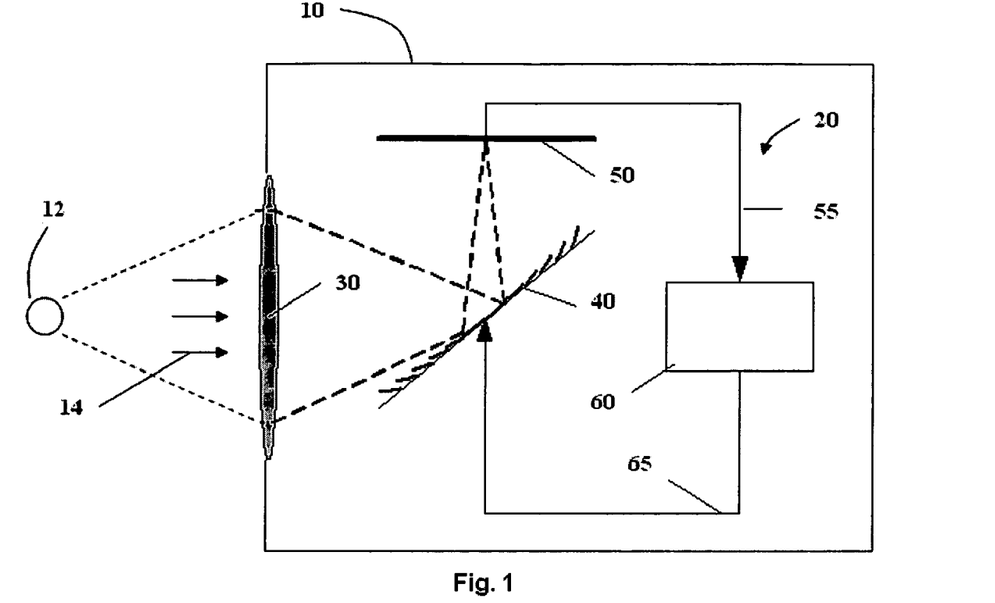
FIG. 1 is a schematic view of an imaging device having an auto focusing lens system in accordance with the present invention.

FIG. 1 shows an imaging device 10 comprising an auto focusing system 20 according to the present invention. The auto focusing lens system 20 comprises a lens 30, a micromirror array lens 40, an image sensor 50, and a signal processor 60.

The lens 30 is preferably a conventional refractive lens having a fixed focal length. The lens can be made of any suitable construction and may be made from glass, plastic or any other suitable material. The lens images an object 12 and is preferably positioned orthogonal to the optical path of light 14 scattered from the object to pass the light to the micromirror array lens 40.

The micromirror array lens 40 is a variable focal length lens. Such a micromirror array lens was proposed by James G. Boyd IV and Gyoungil Cho in their paper entitled, "Fast-response Variable Focusing Micromirror Array Lens", *Proc. SPIE*, Vol. 5055, pp. 278–286 (2003), and improvements of the micromirror array lens are disclosed in U.S. patent application Ser. No. 10/806,299 (filed Mar. 23, 2004), Ser. No. 10/855,554 (filed Mar. 27, 2004), Ser. No. 10/855,715 (filed Mar. 27, 2004), Ser. No. 10/855,287 (filed Mar. 27, 2004), Ser. No. 10/857,796 (filed Mar. 28, 2004), and Ser. No. 10/857,280 (filed Mar. 28, 2004), the entire disclosures of which are incorporated herein by reference.

Figure 2:
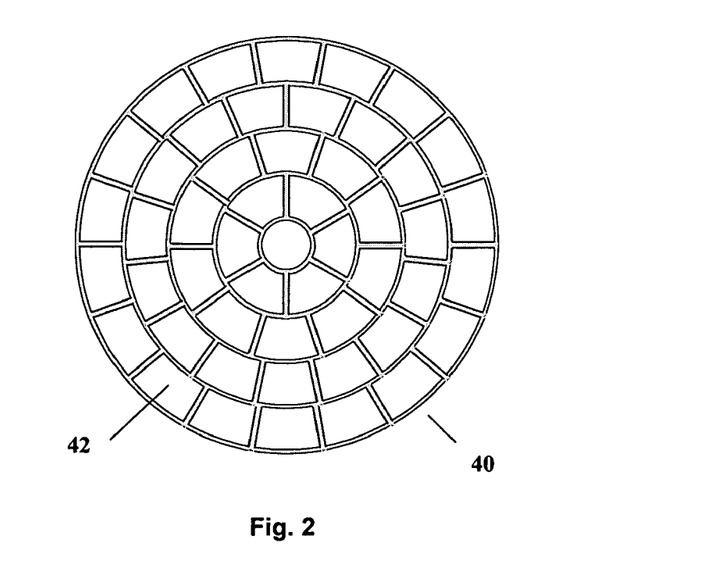
FIG. 2 is a top view of a micromirror array lens comprised within the auto focusing lens system of FIG. 1.

As shown in FIG. 2, the micromirror array lens 40 comprises a plurality of micromirrors 42 concentrically arranged in a plane to form one or more concentric circles. Preferably, the micromirrors are individually controlled electrostatically and/or electromagnetically by actuating components that rotate and translate the micromirrors. Each micromirror comprises a reflective surface preferably made of metal. It is presently preferred that the reflective surface of the micromirrors comprise a slight curvature, and each micromirror have a fan shape to increase the effective reflective area of the micromirror array lens. This increases the optical efficiency of the lens.

In another embodiment, the reflective surface of the micromirrors 42 may be flat.

The mechanical structures upholding the micromirrors 42 and the actuating components that rotate and translate the micromirrors are located under the micromirrors to enable the micromirrors to be positioned closer to one another. This also increases the effective reflective area of the micromirror array lens. Since the micromirrors are small in mass and generate small moments of inertia, their positions and attitudes may be changed at rate of approximately 10 kHz. Therefore, the micromirror array lens becomes a high speed variable focusing lens having a focusing response speed of approximately 10 kHz.

Figure 3A:
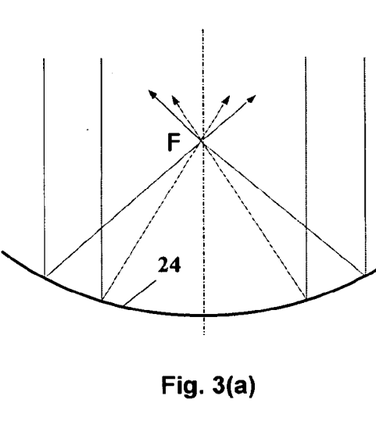
FIGS. 3(a) and 3(b) are schematic side views illustrating how a micromirror array lens replaces a conventional concave mirror.
Figure 3B:
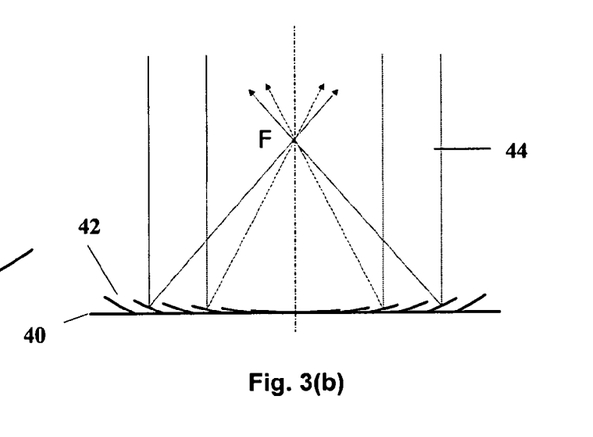

FIGS. 3(a) and (b) illustrate the analogy between a micromirror array lens 40 and a conventional concave mirror 24. It is well known that a concave mirror functions as a convex refractive lens with a fixed focal length. However, a micromirror array lens 40, as shown in FIG. 3(b), comprises a plurality of micromirrors 42, and unlike the conventional concave mirror, the micromirror array lens can change its focal length by controlling the rotational and/or translational motion of micromirrors 42. The micromirror array lens is a type of reflective Frensel lens.

FIG. 3(b) illustrates how the micromirror array lens 40 gets an image. Accordingly, arbitrarily scattered light 44 is converged into one point F on an image plane by controlling the position of the micromirrors 42. The phases of the arbitrary light 44 may be adjusted to be the same by translating each one of the micromirrors 42. The required translational displacement range of the micromirrors is at least half of the wavelength of light.

The focal length F of the micromirror array lens 40 is changed by controlling the rotational and/or translational motion of each micromirror 42. Because the micromirrors can have rotational and translational motion, the micromirror array lens can be a Spatial Light Modulator (SLM). Therefore, by controlling each micromirror independently, the lens can correct aberration, which is caused by optical effects due to the medium between the object and its image or is caused by defects of a lens system that cause its image to deviate from the rules of paraxial imagery. The micromirrors retract or elevate to length or shorten the optical path length of light scattered from the image, to remove phase aberrations from the image.

As discussed above, it is desired that each micromirror 42 have a curvature because the ideal shape of a conventional reflective lens has a curvature. However, since the aberration of the micromirror array lens with flat micromirrors is not much different from a conventional lens with curvature if the size of the micromirrors is small enough, there is not much need to control the curvature of the micromirrors.

Referring now back to FIG. 1, the image sensor may be a coupled charge device (CCD), a CMOS image sensor, or any other suitable alternative. In other embodiments, the image sensor may comprise one or more photo detectors. The image sensor coverts photo energy of the light scattered from the object into electric energy, in the form of an electrical signal 55. The electrical signal carries image data concerning the object. The image sensor sends the generated signal to the signal processor 60 for processing.

The signal processor 60 is preferably a central processing unit (cpu) comprised within, or detachable from the image device 10. The signal processor 60 uses an algorithm to analyze the sharpness and contrast of the image data. Various signal processing algorithms can be used according to the invention, including, but not limited, a method using sharpness criterion. The signal processor compares the image quality of the image data with its focus criteria and generates a control signal 65. The control signal is sent to the micromirror array lens 40 to adjust the focus of the object's image.

FIG. 1 illustrates the operation of an auto focusing system according to the invention. First, the light scattered from the object 12 is refracted by the lens 30 and is reflected by the micromirror array lens 40 to the image sensor 20. The light reflected from the micromirror array lens is received by the image sensor 20 and converted into an electrical signal 55 carrying the object's image data. The electrical signal is then sent to the signal processor 60, where the image data is analyzed and compared to the camera focus criteria. Based on the compared image data, as discussed in further detail below, the signal processor generates a control signal 65. The control signal is sent to the micromirror array lens to adjust the focal length of the micromirror array lens.

Figure 4:
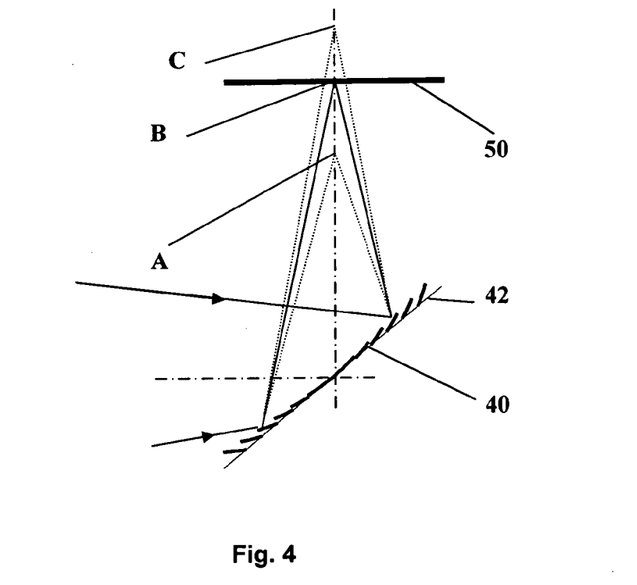
FIG. 4 is an exploded schematic side view of the auto focusing lens system of FIG. 1.

As shown in FIG. 4, the focal length of the micromirror array lens 40 affects the quality of the image received by the image sensor 50. For instance, if the micromirror array lens has a focal length which causes the reflected light 14 to be in-focused at a point A short of the image sensor 50, the image sensor will generate an electrical signal 55 carrying "blurred" image data. Accordingly, the signal processor will process the "blurred" signal and send a control signal 65 to the micromirror array lens, causing the positions of the micromirrors 42 to adjust to lengthen the focal length of the micromirror array lens.

Similarly, if the focal length of the micromirror array lens causes the reflected light to be in-focused at a point C behind the image sensor 50, the image sensor will likewise generate an electrical signal 55 carrying "blurred" image data. Accordingly, the signal processor will process the "blurred" signal and send a control signal 65 to the micromirror array lens, causing the arrangement of the micromirrors 42 to adjust to shorten the focal length of the micromirror array lens.

In that regard, the focal length of the micromirror array lens is adjusted in an iterative process until the reflected light is in-focused at a point B on the image sensor, which provides a "sharp" image, satisfying the camera focus criteria. The iterative process is preferably completed with the afterimage speed of the human eye. Thus, the signal processor must have a speed equal to or grater than the product of the number of iterative adjustments and the afterimage speed of the human eye. For example, if the micromirror array lens is adjusted to meet the focus criteria in 5 iterations, then the signal processor must has a processing time of at least 150 Hz (5 iterations×the afterimage speed of 30 Hz).

Generally, the response of an automatic focusing system is not limited by the speed of the signal processor but rather by the speed of the focusing mechanism. In conventional automatic focusing systems, a control signal is sent to a motor and/or piezoelectric actuator to control the position of a lens or lens system. Therefore, the response time of conventional auto focusing systems is a function of the image processing time and the time it takes to control the position of the lens.

However, in the present invention, the focal length change speed of the micromirror array lens is approximately 10 kHz. Thus, the auto focusing time of the present invention is almost a function of the image processing time because the focal length change speed of the micromirror array lens is much faster than the imaging processing speed. Accordingly, the auto focusing time of the present invention is improved over conventional auto focusing systems.

Auto focusing systems in accordance with the present invention may be used within existing analog and digital cameras, including small cameras used in mobile phone and personal digital assistant (PDA), camcorder, broadcasting camera, movie camera and other alternatives. Such systems may also be used in zooming systems of existing imaging devices.

Figure 5:
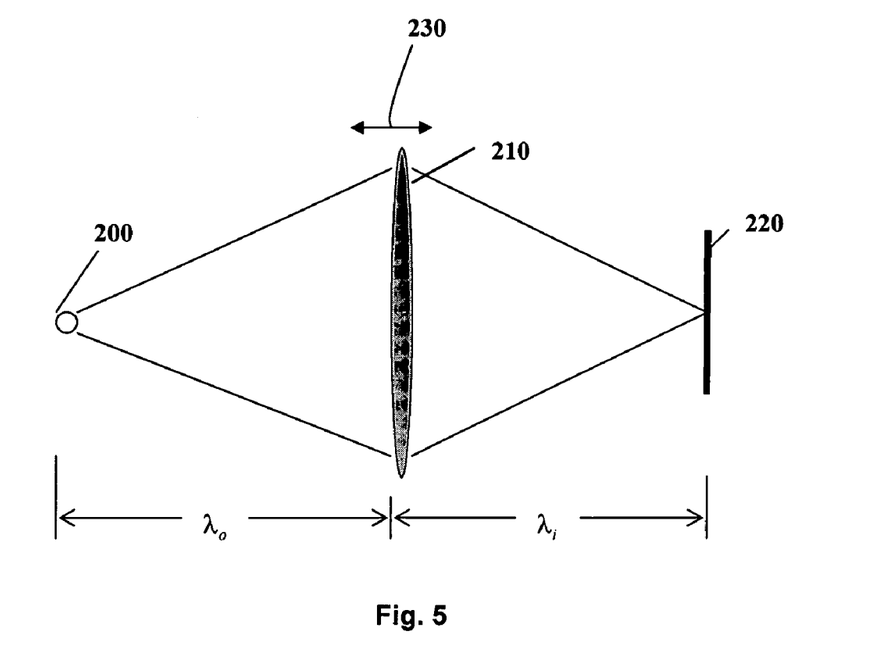
FIG. 5 is a schematic view illustrating the Lens Formula.

A further distinguishing feature of the present invention is illustrated in FIG. 5. The mathematical relationship between the distances from a lens 210 to an object 200 and image sensor 220 is set forth in a common Gaussian form of the Lens Equation:

$$\frac{1}{\lambda_o} + \frac{1}{\lambda_i} = \frac{1}{f}$$

Where $\lambda_o$ is the distance between the lens and the object, $\lambda_i$ is the distance between the lens and the image sensor, and f is effective focal length of the auto focusing lens system.

In conventional auto focusing systems, the focal length f of the lens is fixed, and the distance $\lambda_i$ between the lens and the image sensor is adjusted, as the distance $\lambda_o$ between the lens and the object is varied. The additional motion and vibration caused by traversing the lens makes it almost impossible to obtain sharp images within an instance.

However, in auto focusing systems of the present invention, the distance $\lambda_i$ between the lens and the image sensor is fixed, and the effective focal length f of the auto focusing system is adjusted as the distance $\lambda_o$ between the lens and the object is varied. Therefore, the vibrational forces applied to focusing systems of the present invention are minimal and objects are focused at a rate faster than the afterimage speed of the human eye.

Figure 6:
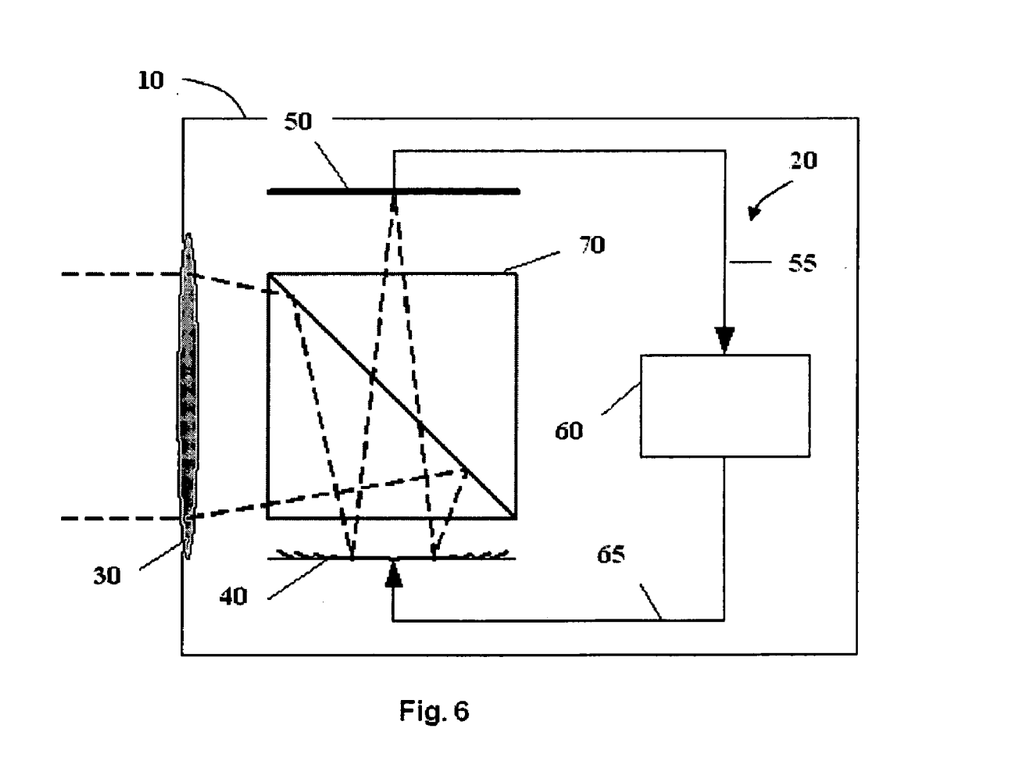
FIG. 6 is a schematic view of an alternative embodiment of an auto focusing lens system in accordance with the present invention.

Referring now to FIG. 6, in an alternative embodiment, the auto focusing system 10 may comprise a beam-splitter 70 positioned in the optical path of light scattered from an object, between the image sensor 20 and the variable focusing lens 30. The image sensor and the micromirror array lens are arranged parallel with each other. The beam splitter changes the direction of the light by 90°, and thus simulates an in-line optical arrangement. The micromirror array lens is positioned orthogonal to the light path.

Figure 7:
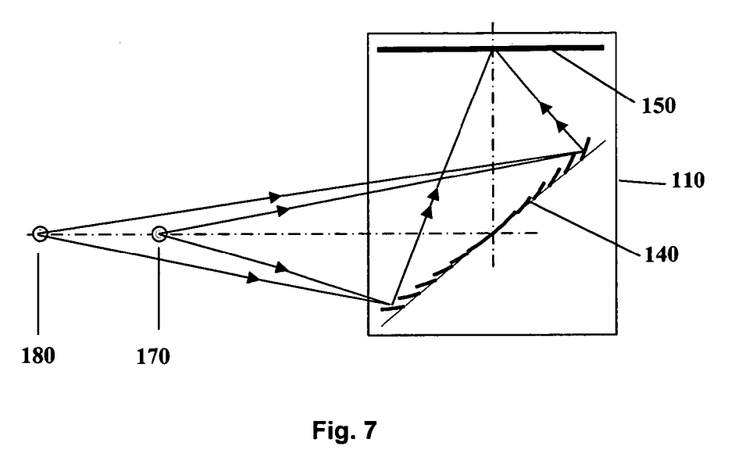
FIG. 7 is a schematic view of a further embodiment of an auto focusing lens system in accordance with the present invention.

In another embodiment, as shown in FIG. 7, the auto focusing system 110 may comprise a single-lens imaging system 110 with auto focusing function. Such system may comprise a micromirror array lens 140 and imaging sensor 150. The focal length of the micromirror array lens may be adjusted to get in-focused images. Thus, the micromirror array lens has a shorter focal length to image the object 170 near to the imaging system, and has a longer focal length to image the object 180 far from the imaging system.

Figure 8:
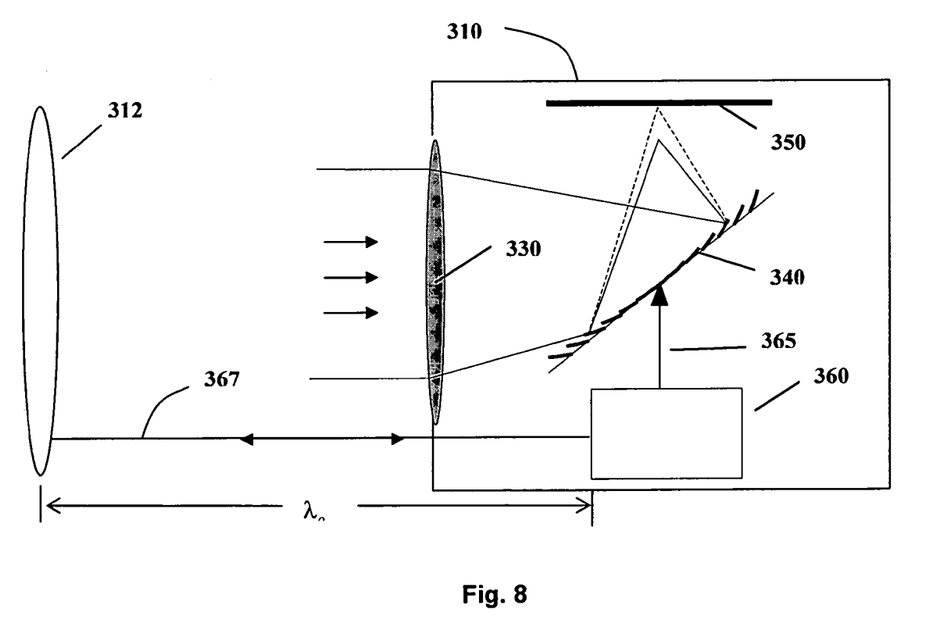
FIG. 8 is a schematic view of an imaging device having an active auto focusing lens system in accordance with the present invention.

FIG. 8 illustrates an imaging device 310 having an active auto focusing system 320 in accordance with the present invention. Auto focusing systems of this embodiment comprise a distance measuring device 360 having an emitter (not shown) that projects beams of energy 367—usually infrared or light energy—out to the object 312, and a detector (not shown) to determine the correct focusing distance $\lambda_o$. Once the object distance is determined, the signal processor applies the Lens Formula to calculate the effective focal length of the system, and sends a control signal to the micromirror array lens to adjust its focal length, accordingly. Auto focusing systems of the present embodiment are ideal for point and shoot cameras.

In sum, auto focusing systems of the present invention eliminate the need for lens moving mechanisms of conventional automatic focusing systems by applying the micromirror array lens to a focusing element. Since the present invention has a smaller number of parts and no macroscopic moving parts, the invention can reduce the physical dimensions, weight, and production cost of the automatic focusing system. The present invention also can improve the ruggedness and service life of automatic focusing systems.

The preceding description has been presented with reference to presently preferred embodiments of the invention. Workers skilled in the art and technology to which this invention pertains will appreciate that alterations and changes in the described structure may be practiced without meaningfully departing from the principal, spirit and scope of the invention.

Accordingly, the foregoing description should not be read as pertaining only to the precise structures described and illustrated in the accompanying drawings, but rather should be read consistent with and as support to the following claims, which are to have their fullest and fair scope.

What is claimed is:

1. An automatic focusing system comprises at least one micromirror array lens comprising a plurality of micromirrors, wherein each micromirror is independently controlled by actuating components and has two degrees of freedom rotation and one degree of freedom translation motion to adjust the focal length of the micromirror array lens and to remove phase aberration from an image.

2. An automatic focusing system of claim 1, further comprising:
an imaging sensor that receives light scattered from an object, wherein the focal length of the micromirror array lens is adjusted to in-focus the object's image on the imaging sensor; and
a signal processor in communication with the image sensor and the micromirror array lens.

3. The automatic focusing system of claim 2, wherein the image sensor converts the photo energy of the light to an electrical signal carrying image data concerning the object, and wherein the image sensor sends the electrical signal to the signal processor.

4. The automatic focusing system of claim 2, wherein the signal processor receives the electrical signal from the image sensor and compares the image quality of the image data with its focus criteria and generates a control signal that is sent to the micromirror array lens to adjust the focal length of the micromirror array lens.

5. The automatic focusing system of claim 4, wherein the control signal activates the actuating components that rotate and/or translate the micromirrors to adjust the focal length of the micromirror array lens.

6. The automatic focusing system of claim 5, wherein the focal length of the micromirror array lens is adjusted until image quality of the image data meets the focus criteria.

7. The automatic focusing system of claim 1, wherein the focusing speed of the automatic focusing system is faster than or equal to the afterimage speed of the human eye.

8. The automatic focusing system of claim 1, wherein the automatic focusing system is used in an imaging device.

9. The automatic focusing system of claim 1, further comprising at least one conventional lens that images the object and passes light scattered from the object to the micromirror array lens.

10. The automatic focusing system of claim 1, further comprising
a distance measuring device with an emitter that projects beams of energy out to the object and a detector to determine the correct focusing distance.

11. The automatic focusing system of claim 1, wherein each micromirror in the micromirror array lens is independently controlled to correct aberration caused by optical effects due to the medium between an object and its image or caused by defects of a lens system that cause its image to deviate from the rules of paraxial imagery.

12. The automatic focusing system of claim 1, wherein the automatic focusing system is used as a part of a zooming system for an imaging device.

13. An imaging device having an active auto focusing function comprising:
at least one micromirror array lens, wherein the micromirror array lens comprises a plurality of micromirrors, and wherein each micromirror is independently controlled by actuating components and has two degrees of freedom rotation and one degree of freedom translation motion to adjust the focal length of the micromirror array lens and to remove phase aberration from an image.

14. The imaging device of claim 13, wherein the automatic focusing system further comprises:
an imaging sensor that receives light scattered from an object, wherein the focal length of the micromirror array lens is adjusted to in-focus the object's image on the imaging sensor; and
a signal processor in communication with the image sensor and the micromirror array lens.

15. The imaging device of claim 14, wherein the image sensor converts the photo energy of the light to an electrical signal carrying image data concerning the object, and wherein the image sensor sends the electrical signal to the signal processor.

16. The imaging device of claim 14, wherein the signal processor receives the electrical signal from the image sensor compares the image quality of the image data with its focus criteria and generates a control signal that is sent to the micromirror array lens to adjust the focal length of the micromirror array lens.

17. The imaging device of claim 16, wherein the control signal activates the actuating components that rotate and/or translate the micromirrors to adjust the focal length of the micromirror array lens.

18. The imaging device of claim 17, wherein the focal length of the micromirror array lens is adjusted until image quality of the image data meets the focus criteria.

19. The imaging device of claim 13, wherein the focusing speed of the automatic focusing system is faster than or equal to the afterimage speed of the human eye.

20. The imaging device of claim 13, wherein the automatic focusing system further comprises at least one conventional lens that images the object and passes light scattered from the object to the micromirror array.

21. The imaging device of claim 13, further comprising a distance measuring device with an emitter that projects beams of energy out to the object and a detector to determine the correct focusing distance.

22. The imaging device of claim 13, wherein each micromirror in the micromirror array lens is independently controlled to correct aberration caused by optical effects due to the medium between the object and its image or is caused by defects of a lens system that cause its image to deviate from the rules of paraxial imagery.

23. The imaging device of claim 13, wherein the automatic focusing system is used as a part of zooming system of the imaging device.

24. A method of focusing an imaged object comprising the steps of:
(a) focusing the image of the object with the micromirror array lens on an image sensor;

(b) converting the photo energy of the light scattered from the object into an electric signal carrying image data concerning the object, and transmitting the signal to a signal processor in communication with the image sensor;

(c) analyzing the image data with focus criteria and generating a control signal that is sent to the micromirror array lens;

(d) transmitting the control signal to activate actuating components of the micromirror array lens that adjust the focal length of the micromirror array lens; and (e) repeating steps (a)–(d) until the quality of the image data satisfies the focus criteria.

25. The method of claim 24, wherein the repeating steps (a)–(d) are completed within the afterimage speed of the human eye.

26. A method of focusing an imaged object comprising the steps of:

(a) measuring an imaged object distance using the distance measuring device;

(b) applying the Lens Formula to determine the effective focal length of the automatic focusing system; and (c) transmitting a control signal from the distance measuring device to a micromirror array lens of the automatic focusing system, wherein the signal activates actuating components that adjust the focal length of the micromirror array lens to the effective focal length; and (d) focusing the object's image on an image sensor, wherein the focal length of the micromirror array lens is adjusted to in-focus the image on the image sensor.

27. The automatic focusing system of claim 1, wherein the micromirrors in the micromirror array lens are individually controlled by actuating components that rotate and translate the micromirror.

28. The automatic focusing system of claim 1, wherein the micromirrors in the micromirror array lens are individually controlled electrostatically and/or electromagnetically.

* * * * *